June 21, 1949.　　　N. D. COOPER ET AL　　　2,473,572
MAGNETIC SERVO OPERATOR
Filed Dec. 11, 1946　　　3 Sheets-Sheet 1
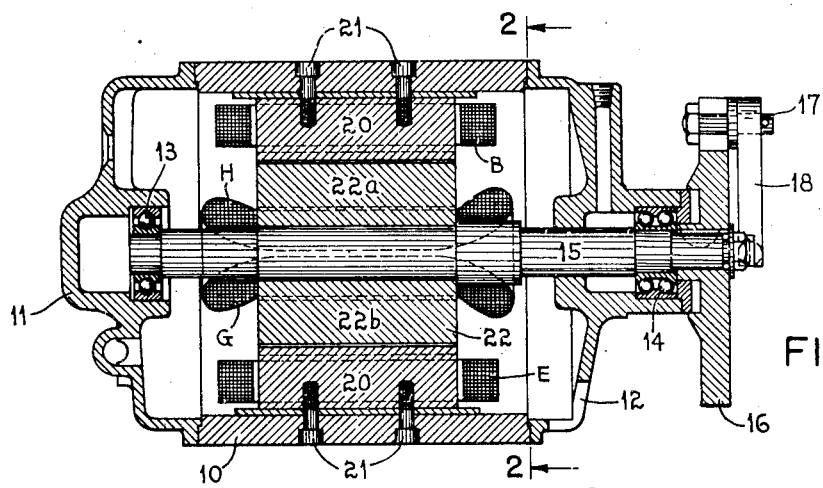
FIG. 1
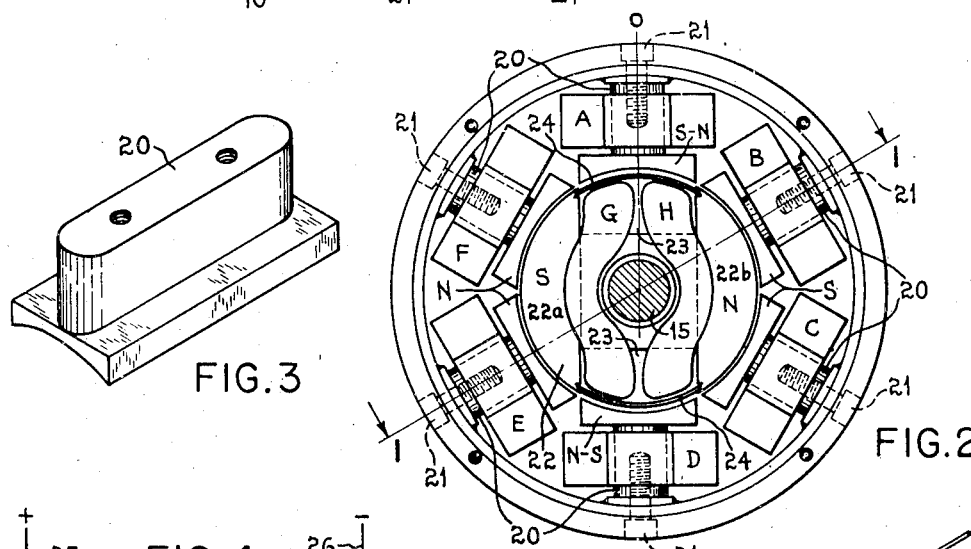
FIG. 3
FIG. 2
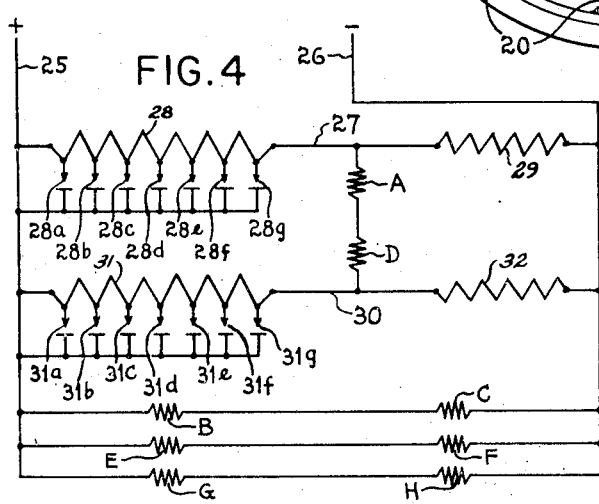
FIG. 4
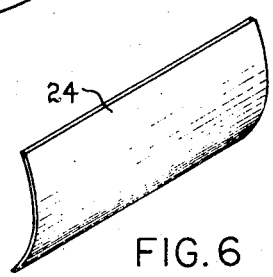
FIG. 6
INVENTORS.
NELSON D. COOPER
AND
BY　EUGENE A. RUCHTY
Toulmin & Toulmin
ATTORNEYS.

June 21, 1949.  N. D. COOPER ET AL  2,473,572
MAGNETIC SERVO OPERATOR
Filed Dec. 11, 1946  3 Sheets-Sheet 2
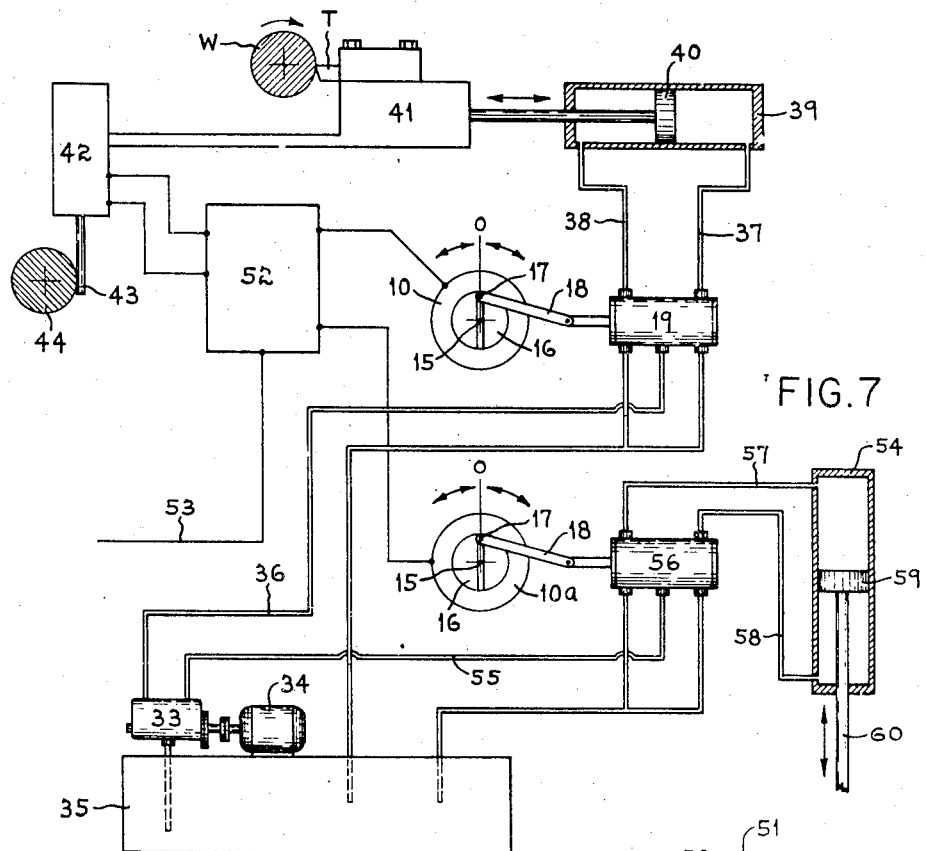
FIG. 7
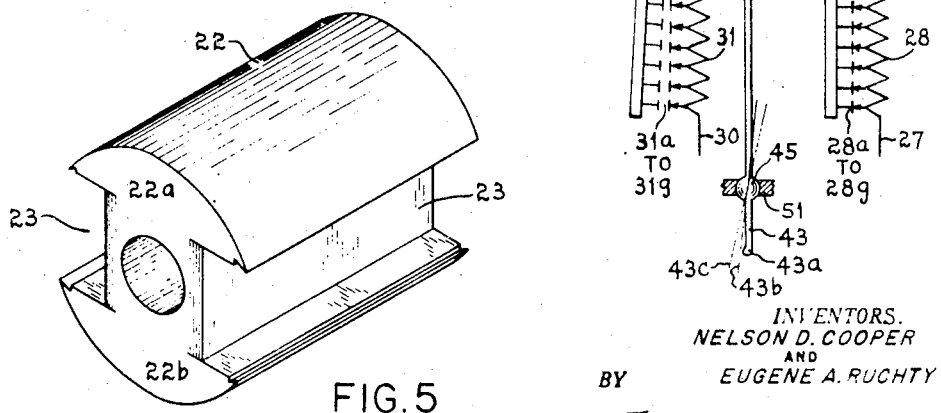
FIG. 4a
FIG. 5
INVENTORS.
NELSON D. COOPER
AND
BY EUGENE A. RUCHTY
Toulmin & Toulmin
ATTORNEYS.

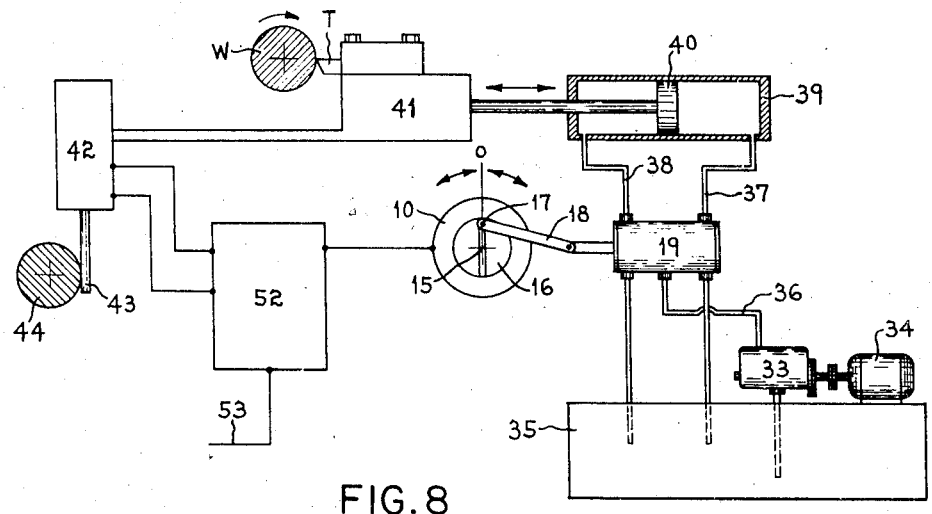
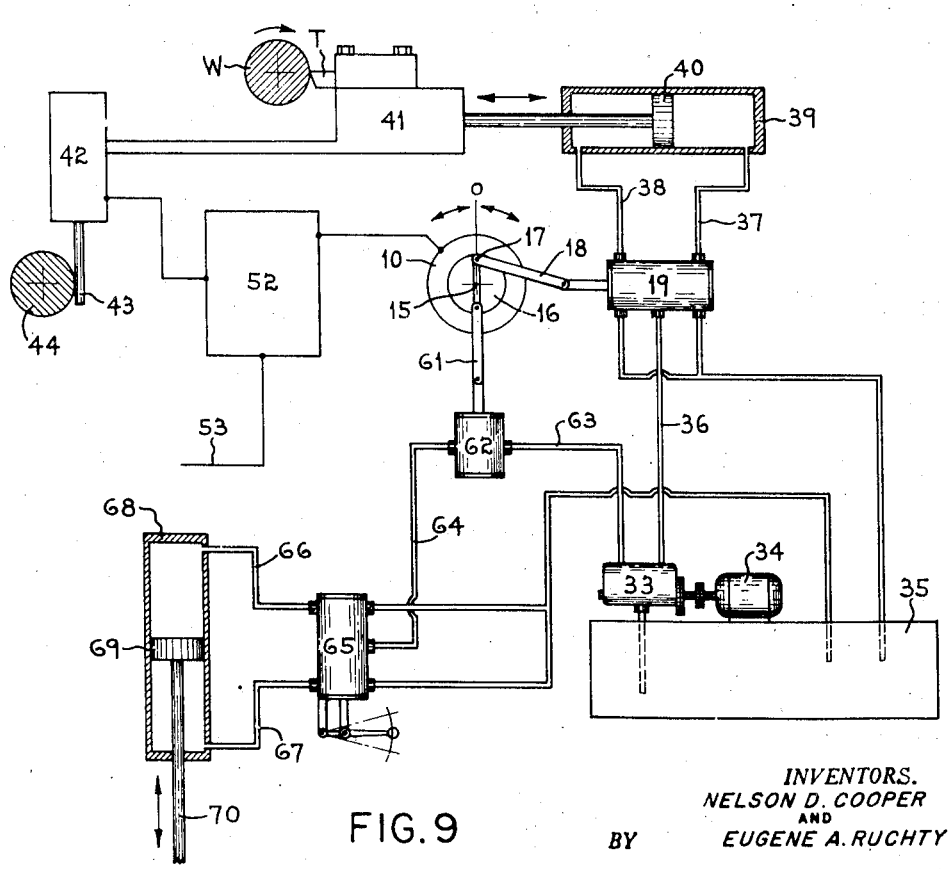

Patented June 21, 1949

2,473,572

UNITED STATES PATENT OFFICE 2,473,572

MAGNETIC SERVO OPERATOR

Nelson D. Cooper, Mariemont, and Eugene A. Ruchty, Norwood, Ohio, assignors to The R. K. Le Blond Machine Tool Company, Cincinnati, Ohio, a corporation of Delaware Application December 11, 1946, Serial No. 715,360

5 Claims. (Cl. 318—25)

1

This invention pertains to improvements in magnetic servo operators and is particularly directed to such type operators used for controlling the application of power to a movable machine tool element.

More particularly, this invention is directed to a magnetic servo operator for controlling the rate and direction of application of power to the tool and work feeding mechanism of a machine tool.

The magnetic servo operator may preferably be used in combination with a suitable valve or valves and may be used as the connecting medium between an electric tracer or combination of an electric tracer and an amplifier and a hydraulic system of a machine tool to control the position of the tool under the influence of a hydraulic cylinder or hydraulic motor such as used for actuating the cross feed mechanism of a lathe. In this way, an automatic contouring operation can be obtained to duplicate the contour of a template or sample, the movement of both tracer and tool or template and tool, if the tracer be stationary, being under the same influence of the combined length and cross feed and therefore follow duplicate paths or some definite ratio of duplicate paths.

One of the objects of this invention is to provide an improved magnetic servo operator between a control tracer mechanism and a source of power to control the source of power to actuate a machine member in conformity to the path of travel of the tracer mechanism over a template whose shape is to be reproduced on the work piece.

Another object of this invention is to provide a magnetic servo operator which is simple in design and accurate in operation for controlling the rate and direction of application of power to a movable machine member.

Still another object of this invention is to provide an improved tracer controlled valve operating mechanism for a hydraulic tracer control tool actuating mechanism.

Still another object of this invention is to provide a magnetic servo operator in which a rotor is actuated through predetermined angular movements for purposes of actuating a control device of a power source applied to actuate a machine tool member.

Further features and advantages of this invention will appear from a detailed description of the drawings in which:

Figure 1 is a longitudinal section through the magnetic servo operator incorporating the features of this invention, indicated on the line 1—1 in Figure 2.

2

Figure 2 is a cross-section of the magnetic servo operator on the line 2—2 of Figure 1.

Figure 3 is an isometric view of one of the pole pieces of the magnetic servo operator.

Figure 4 is an elementary wiring diagram showing a preferred method of energizing the operating coils of the magnetic servo operator.

Figure 4a is a diagrammatic view of a tracer mechanism preferably usable to control the servo operator.

Figure 5 is an isometric view of the rotor of the magnetic servo operator.

Figure 6 is an isometric view of one of the coil enclosing plates of the rotor of Figure 5.

Figure 7 is a diagram showing the utilization of the magnetic servo operator in an automatic tracer controlled hydraulic circuit having a plurality of relatively movable machine elements.

Figure 8 is a diagram showing the use of the magnetic servo operator in a hydraulic tracer control circuit incorporating a single movable element of a machine tool.

Figure 9 is a diagram showing the utilization of the magnetic servo operator in a circuit similar to Figure 8 but including a control for automatic slow down of the movement of a second machine element moving in an angularly related direction to the first machine element.

Referring particularly to Figures 1 and 2, the magnetic servo operator shown on this drawing comprises a frame 10 to which is fixed the end bell housings 11 and 12 which carry the journaled bearings 13 and 14 for the rock shaft 15 of the servo operator. Fixed to the rock shaft is the actuating disc 16 having a radially adjustable crankpin 17 to which may be connected the actuating link 18 which in turn is connected to a control member or hydraulic control valve such as the valves 19 and 56, Figures 7, 8, and 9, so as to be controlled by the servo operator.

In this exemplary arrangement, there are provided six pole pieces 20, each secured to the frame 10 by suitable screws 21. About each of the pole pieces 20 is mounted field coils A, B, C, D, E, and F, as best seen in Figure 2. A rotor 22, Figures 1, 2, and 5, comprising a cylindrical member with coil slots 23 and enclosure plates 24 for these slots and having wound on it a pair of rotor coils G and H, is rigidly fixed to the rock shaft 15 of the servo operator.

The magnetic servo operator is designed for operation from a suitable source of direct current power such as the leads 25 and 26, Figure 4. The coils B and C are serially connected across the leads 25 and 26 in such a way as to provide south poles S for the respective pole pieces 20 of the coils B and C. The coils E and F are serially connected across the leads 25 and 26 in such a way that north poles N are provided for the pole pieces 20 associated with the coils E and F. The rotor coils G and H are also continuously energized, through flexible leads or collector rings (not shown), by being serially connected across the leads 25 and 26 so that the rotor segment 22a is magnetized a south pole S while the rotor segment 22b is magnetized a north pole. Thus, with the field coils B, C, E, and F and the rotor coils G and H thus constantly energized, the rotor is normally held in its centralized position O shown in Figure 2.

The coils A and D are serially interconnected, as shown in Figure 4, across the outer leads 27 and 30, the coil A being connected through a variable resistor 28 to the lead 25 and through a fixed resistor 29 to the lead 26. The lead 30 of the coil D is connected through a variable resistor 31 to the lead 25 and a fixed resistor 32 connected to the lead 26. The arrangement is such that by decreasing the value of resistor 28, as by sequentially closing the contacts 28a to 28g, inclusive, current will then flow from lead 25 through the resistor 28, coils A and D to lead 30 and through the fixed resistor 32 back to the lead 26 to energize the coils A and D so as to cause the pole piece 20 associated with the coil A to be magnetized a south pole while the pole piece associated with the coil D is magnetized a north pole with the result that the rotor 22 is rotated in a counterclockwise direction, Figures 2, 7, 8, and 9, to cause the linkage mechanism to actuate the control member such as the valves 19 and 56.

In Figure 8, valve 19 receives fluid pressure from a pump 33 driven by a suitable electric motor 34 which receives its supply of fluid from the reservoir 35 and delivers it through pressure line 36 to the valve 19 from which fluid is transmitted through lines 37 and 38 so as to apply pressure in the tool feeding cylinder 39 to actuate its piston 40 to cause the tool slide 41 and cutting tool T to move toward the work piece W. By closing more and more of the contacts 28a through 28g, inclusive, the current flowing through the coils A and D may be increased so as to effect a greater deflection of counterclockwise motion of the rotor 22 and therefore vary the flow of pressure through the valve 19 to the actuating cylinder 39. In other words, in this arrangement, increased current through the coils A and D causes increased deflection in the rotor 22 and increased flow of fluid pressure to the cylinder 39.

Similarly, by successively closing appropriate contacts 31a through 31g, inclusive, current will then flow from the lead 30 through coils D and A through resistor 29 so as to reverse the polarity of the pole pieces associated with these coils to cause the pole associated with coil A to take on a north magnetic character while the pole piece associated with the coil D will take on a south magnetic character and thus cause the rotor to rock in a clockwise direction, Figure 2. Again, the intensity of the current flowing through coils D and A, determined by the number of closed contacts 31a through 31g, inclusive, will directly vary the extent of arcuate rocking motion in the rotor 22.

By automatically simultaneously controlling the contacts 28a through 28g, inclusive, and 31a through 31g, inclusive, by a suitable tracer control mechanism, the extent rocking motion of the rotor 22 relative to an intermediate zero position may be accurately controlled so that this motion may be utilized to actuate the valve 19 to cause exact following of the tool T along the work W in response to the contact of the tracer stylus 43 of the tracer 42 following the work template or pattern 44, Figure 8.

In Figure 4a is shown diagrammatically a form of tracer in which the stylus 43 simultaneously controls the variable resistors 28 and 31. In this arrangement, the tracer stylus 43 is pivotally mounted at 45 and has at its upper end a ball and socket arrangement at 46 which cooperates with a lever 47 for actuating the contacts 28a to 28g of the resistor 28. A second ball and socket connection at 48 connects to a lever 49 for sequentially controlling the operation of the contacts 31a to 31g. A compression spring 50 engaging the frame 51 of the tracer 42 normally holds the tracer stem in position 43a with all of the contacts 28a to 28g closed so that the valve 19, Figure 8, will be held in position for rapid in-feed of the tool T to the work W. As soon as this tracer stylus 43 engages the template 44, it moves to tracing position 43b whereby the tracer stylus 43 is partially deflected so as to maintain both contacts 28a to 28g and 31a to 31g open so that the magnetic servo operator will return to its neutral zero position to arrest further movement in the tool T. Upon meeting an obstruction on the template 44, the tracer stylus 43 will be further deflected to the position 43c whereupon contacts 31a to 31g will be successively closed while contacts 28a to 28g will be maintained open. It is also practical to simultaneously successively close contacts 28a to 28g while successively opening contacts 31a to 31g, or vice versa, by appropriately regulating the levers 47 and 49 so that as the tracer stylus 43 is moved either side of tracing position 43b, the servo operator rotor 22 will rock back and forth each side of zero position to automatically accurately regulate the position of the control valve 19 and cause the tool T to exactly follow a path on the work W which is a replica of the configuration of the template 44 being contacted by the tracer stylus 43.

Referring more particularly to Figure 8, it is preferable to use, in conjunction with such a tracer 42 as shown in Figure 4a, an amplifier 52 for increasing the controlled current for actuating the servo operator. The amplifier 52 may be of any conventional form receiving power supply at 53 and utilizing conventional electronic tube control devices for amplifying and providing a desired source of D. C. voltage for the leads 25 and 26 for the magnetic servo operator.

In Figure 7 is shown an arrangement where a plurality of magnetic servo operators are controlled through an amplifier 52 from a tracer 42 so as to control the movement of two independent cylinders 39 and 54, the cylinder 54 being utilized, for example, for the longitudinal feed movement of the tool T while the cylinder 39 is used for the cross feed movement. In this arrangement, fluid pressure from the pump 33 is connected to the valve 19 and actuating cylinder 39 as described in Figure 8. A pressure supply line 55 from the pump 33 is connected to the control valve 56 actuated by a servo operator 10a of the same design as the servo operator 10. The valve 56 is connected through lines 57 and 58 to the longitudinal feed actuating cylinder 54 having a piston 59 suitably connected by its piston rod 60 to the machine tool member to be actuated. Thus, in this arrangement, the tracer 42 controls the rate and direction of both the cross feed movement and the longitudinal feed movement of a lathe tool T.

In Figure 9 is shown an arrangement where a supplemental control linkage 61 is connected to the actuating disc 16 of the servo operator 10 for actuating a slow down valve 62 receiving a supply of fluid pressure from line 63 and delivering this pressure through a line 64 to a manually operated direction control valve 65 connected through lines 66 and 67 to the longitudinal feed cylinder 68 having a piston 69 and rod 70 connected to a suitable longitudinal movement machine tool slide or carriage. In this arrangement, as the servo operator rocks from its zero position toward either maximum position of cross slide movement, the linkage 61 also connected to the disc 16 actuates the shut off valve 62 so as to automatically reduce or stop longitudinal movement with increase of cross slide movement so as to provide more accurate follow of the tool and template where sudden changes in cross slide movement take place.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a magnetic servo control system including a constant source of direct current potential, a series of field magnets including field coils connected to be constantly energized with a predetermined magnetic flux, a rotor in said field magnets, rotor coils thereon constantly energized from said source of potential, having further field magnets and field coils, two pairs of serially connected variable and fixed resistors connected in parallel across said source of potential, means for connecting said further field coils between both of said pairs at an intermediate point between said variable resistors and said fixed resistors, and means for simultaneously varying said variable resistors to effect angular rocking motion in said rotor relative to said field magnets.

2. In a magnetic servo control system, a pair of conductors supplying a constant direct current potential, a servo operator comprising a rotor and a plurality of electro-magnets surrounding said rotor, a plurality of coils on said rotor cooperatively related to pole pieces thereon, means for connecting some of said field electro-magnets and said rotor coils to said conductors to receive a constant potential, and means for connecting other of said field electro-magnets in series with one end of said series electro magnets connected through a first variable resistor to one of said conductors and through a first fixed resistor to the other conductor, means for connecting the other end of said series electro-magnets through a second variable resistor to said one conductor and through a second fixed resistor to the other conductor, and means for simultaneously regulating both of said variable resistors to effect rocking motion in said rotor.

3. A magnetic servo operator comprising a frame, a rock shaft journaled in said frame, a rotor fixed on said rock shaft, a series of pole pieces, field coils around said pole pieces, pole pieces on said rotor, field coils on said rotor associated with said pole pieces, means for connecting some of the coils of said field pole pieces to a constant source of electrical potential, means for connecting said rotor coils to the same constant source of electrical potential whereby said rotor is normally held in a predetermined zero position, and means for variably applying electromotive force to other of said field coils and pole pieces to cause predetermined amounts of angular rocking motion in said rotor either side of said zero position comprising two pairs of serially interconnected resistors connected in parallel across said source of potential, a variable resistor contact device for each of the resistors connected to one side of said source of potential including a series of contacts connected to said one side and simultaneously operated to progressively engage said contacts to increase one of said resistors while decreasing the other of said resistors and means for connecting said other field coils across said pairs of resistors at points between the resistors of each pair.

4. In an electrical circuit for a magnetic servo operator having a pair of conductors charged with a predetermined direct current potential, a series of field coils connected across said conductors, a series of rotor coils connected across said conductors, a plurality of variable and fixed resistors connected across said leads parallel to said mentioned field and rotor coils, and a further series of field coils shunted across and between said variable and fixed resistors whereby the variation of said variable resistors causes said rotor coils to rotate relative to said field coils.

5. In a magnetic servo operator control circuit, a pair of conductors carrying a fixed predetermined direct current potential, a series of field coils connected across said conductors, a series of rotor coils connected across said conductors, a first connection across said conductors including a variable resistor and a fixed resistor, a second connection across said conductors including a variable resistor and a fixed resistor, and further field coils interconnected between said variable resistors and said fixed resistors whereby regulation of said variable resistors causes rotation of said rotor coils relative to said field coils.

NELSON D. COOPER.
EUGENE A. RUCHTY.

REFERENCES CITED

The following references are of record in the file of this patent:

UNITED STATES PATENTS

| Number | Name | Date |
| --- | --- | --- |
| 1,783,851 | McCoy | Dec. 2, 1930 |
| 1,881,394 | Aull | Oct. 4, 1932 |
| 1,949,145 | DeLucca | Feb. 27, 1934 |
| 1,953,435 | Satinoff et al. | Apr. 3, 1934 |
| 2,331,337 | Meyer | Oct. 12, 1943 |
| 2,359,085 | Chubb | Sept. 26, 1944 |
| 2,389,407 | Bolas | Nov. 20, 1945 |
| 2,422,137 | Schindler | June 10, 1947 |
| 2,437,603 | Hornfeck | Mar. 9, 1948 |